US010290212B2

(12) United States Patent
Kawagishi (10) Patent No.: US 10,290,212 B2
(45) Date of Patent: May 14, 2019

(54) DRIVE CONTROL APPARATUS AND DRIVE CONTROL METHOD (71) Applicant: Mitsubishi Electric Corporation, Tokyo (JP)

(72) Inventor: Toshio Kawagishi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 47 days.

(21) Appl. No.: 15/532,323

(22) PCT Filed: Mar. 19, 2015

(86) PCT No.: PCT/JP2015/058174
§ 371 (c)(1),
(2) Date: Jun. 1, 2017

(87) PCT Pub. No.: WO2016/147368
PCT Pub. Date: Sep. 22, 2016

(65) Prior Publication Data
US 2017/0270796 A1 Sep. 21, 2017

(51) Int. Cl.
B60W 30/00 (2006.01)
B60W 30/06 (2006.01)
(Continued)

(52) U.S. Cl.
CPC ............ *G08G 1/145* (2013.01); *B60W 30/06* (2013.01); *B60W 50/14* (2013.01);
(Continued)

(58) Field of Classification Search
CPC ............ G08G 1/00; G08G 1/14; G08G 1/143; G08G 1/145; B60W 30/00; B60W 30/06;
(Continued)

(56) References Cited

U.S. PATENT DOCUMENTS 9,834,210 B2 * 12/2017 Ohbayashi ............ B60W 10/18
9,862,416 B2 * 1/2018 Imai ..................... G08G 1/166
(Continued)

FOREIGN PATENT DOCUMENTS

JP 2002-243471 A 8/2002
JP 2007-248155 A 9/2007
(Continued)

OTHER PUBLICATIONS

Office Action issued in the counterpart Japanese Application No. 2017-505965, dated Dec. 5, 2017 with an English Translation thereof.

*Primary Examiner* — Yonel Beaulieu
(74) *Attorney, Agent, or Firm* — Birch, Stewart, Kolasch & Birch, LLP (57) ABSTRACT An object of the present invention is to provide a drive control apparatus and a drive control method for reducing time and effort of parking. A drive control apparatus according to the present invention includes a processor to execute a program and a memory to store the program which, when executed by the processor, performs processes of: acquiring a traveling information; detecting a stop position of a vehicle, which is manually driven, based on the traveling information and determining whether or not the stop position is included in a no-parking area with reference to a map data in which information of the no-parking area is described; searching for a parking area including an empty space when it is determined that the stop position is included in the no-parking area; and instructing the vehicle to perform an automatic driving from the stop position to the parking area including the empty space.

7 Claims, 9 Drawing Sheets (51) Int. Cl.
*B60W 50/14* (2012.01)
*G01C 21/34* (2006.01)
*G01C 21/36* (2006.01)
*G08G 1/14* (2006.01)
*G05D 1/00* (2006.01)
*G07B 15/00* (2011.01)
*G05D 1/02* (2006.01)

(52) U.S. Cl.
CPC ..... *G01C 21/3438* (2013.01); *G01C 21/3667* (2013.01); *G01C 21/3685* (2013.01); *G05D 1/0022* (2013.01); *G05D 1/0212* (2013.01); *G07B 15/00* (2013.01); *G08G 1/14* (2013.01); *G08G 1/143* (2013.01); *B60W 2550/10* (2013.01)

(58) Field of Classification Search
CPC .... G01C 21/26; G01C 21/36; G01C 21/3438; G01C 21/3667; G05D 1/00; G05D 1/02; G05D 1/0022; G05D 1/0212; G07B 15/00
See application file for complete search history.

(56) References Cited

U.S. PATENT DOCUMENTS

| | | | | |
|---|---|---|---|---|
| 9,981,656 | B2* | 5/2018 | Bales | B60W 30/06 |
| 10,049,579 | B2* | 8/2018 | Morimura | B60W 50/14 |
| 10,074,275 | B2* | 9/2018 | Aoki | G08G 1/096725 |
| 2005/0035879 | A1* | 2/2005 | Gotzig | B60Q 9/006 |
| | | | | 340/932.2 |
| 2010/0033348 | A1* | 2/2010 | Kawabata | B60R 1/00 |
| | | | | 340/932.2 |
| 2011/0087406 | A1* | 4/2011 | Barth | B62D 15/027 |
| | | | | 701/41 |
| 2011/0273310 | A1* | 11/2011 | Kadowaki | B62D 15/0285 |
| | | | | 340/932.2 |
| 2012/0287279 | A1* | 11/2012 | Tanaka | G08G 1/168 |
| | | | | 348/148 |
| 2013/0096816 | A1* | 4/2013 | Takano | B62D 15/0265 |
| | | | | 701/400 |
| 2013/0151060 | A1* | 6/2013 | Lee | B62D 15/0285 |
| | | | | 701/25 |
| 2013/0265175 | A1* | 10/2013 | Kang | G08G 1/168 |
| | | | | 340/932.2 |
| 2014/0067207 | A1* | 3/2014 | Noh | G08G 1/168 |
| | | | | 701/41 |
| 2014/0244151 | A1* | 8/2014 | Matsubara | G08G 1/165 |
| | | | | 701/301 |
| 2016/0272244 | A1* | 9/2016 | Imai | G08G 1/166 |
| 2018/0208199 | A1* | 7/2018 | Fujita | G08G 1/00 |
| 2018/0211532 | A1* | 7/2018 | Aoki | G08G 1/00 |
| 2018/0218600 | A1* | 8/2018 | Fujita | G08G 1/00 |
| 2018/0218601 | A1* | 8/2018 | Aoki | B60W 40/04 |

FOREIGN PATENT DOCUMENTS

| | | |
|---|---|---|
| JP | 2009-121908 A | 6/2009 |
| JP | 2009-121938 A | 6/2009 |
| JP | 2010-3170 A | 1/2010 |
| JP | 2012-48563 A | 3/2012 |

* cited by examiner

DRIVE CONTROL APPARATUS AND DRIVE CONTROL METHOD

TECHNICAL FIELD

The present invention relates to a drive control of a vehicle having an automatic driving function.

BACKGROUND ART

When a user drives a vehicle to a destination, the driver normally needs to park the vehicle in a parking area around the destination. When a facility in the destination has the parking area, the user can park the vehicle in the parking area, however, when it does not, the user needs to search for a parking area around the destination by himself/herself. The reason is that in most cases, parking on a public road is legally prohibited, and the parking in such an area causes a penalty on the user.

Patent Document 1 discloses a navigation apparatus which searches for a parking area near the destination upon setting the destination, and suggests the parking area to the user with a view to reducing a user's burden of searching for the parking area by himself/herself.

PRIOR ART DOCUMENTS

Patent Documents

[Patent Document 1]: Japanese Patent Application Laid-Open No. 2002-243471

SUMMARY OF THE INVENTION

Problems to be Solved by the Invention

According to a technique of the Patent Document 1, the user's burden of searching for the parking area is reduced. However, the user needs to drive to the suggested parking area and park the vehicle there by himself/herself. When the suggested parking area is located away from the destination, the user is forced to suffer inconvenience of walking from the parking area to the destination.

The present invention has been made in view of the above-described problem, and it is an object of the present invention to provide a drive control apparatus and a drive control method for reducing time and effort of parking.

Means for Solving the Problems

A drive control apparatus according to the present invention includes a processor to execute a program; and a memory to store the program which, when executed by the processor, performs processes of: acquiring a traveling information indicating a position, a speed, and a traveling state, that is to say, an automatic driving or a manual driving, of a vehicle having an automatic driving function; detecting a stop position of a vehicle, which is manually driven, based on the traveling information and determining whether or not the stop position is included in a no-parking area with reference to a map data in which information of the no-parking area is described; searching for a parking area including an empty space when it is determined that the stop position is included in the no-parking area; instructing the vehicle to perform an automatic driving from the stop position to the parking area including the empty space; receiving a getting-in information including a position information of a next getting-in point from a mobile terminal of a user; and instructing the vehicle to perform the automatic driving from the parking area including the empty space to the next getting-in point, when receiving the getting-in information.

EFFECTS OF THE INVENTION

A drive control apparatus according to the present invention includes a processor to execute a program; and a memory to store the program which, when executed by the processor, performs processes of: acquiring a traveling information indicating a position, a speed, and a traveling state, that is to say, an automatic driving or a manual driving, of a vehicle having an automatic driving function; detecting a stop position of a vehicle, which is manually driven, based on the traveling information and determining whether or not the stop position is included in a no-parking area with reference to a map data in which information of the no-parking area is described; searching for a parking area including an empty space when it is determined that the stop position is included in the no-parking area; instructing the vehicle to perform an automatic driving from the stop position to the parking area including the empty space; receiving a getting-in information including a position information of a next getting-in point from a mobile terminal of a user; and instructing the vehicle to perform the automatic driving from the parking area including the empty space to the next getting-in point, when receiving the getting-in information. Accordingly, when a user gets out of the vehicle in a destination, the vehicle is automatically driven and parked in the parking area including the empty space, so that there is no need for the user to search for the parking area including the empty space by himself/herself in consideration of illegal parking.

These and other objects, features, aspects and advantages of the present invention will become more apparent from the following detailed description of the present invention when taken in conjunction with the accompanying drawings.

PREFERRED EMBODIMENTS FOR IMPLEMENTING THE INVENTION

<A. Embodiment 1>
<A-1. Configuration>

Figure 1:
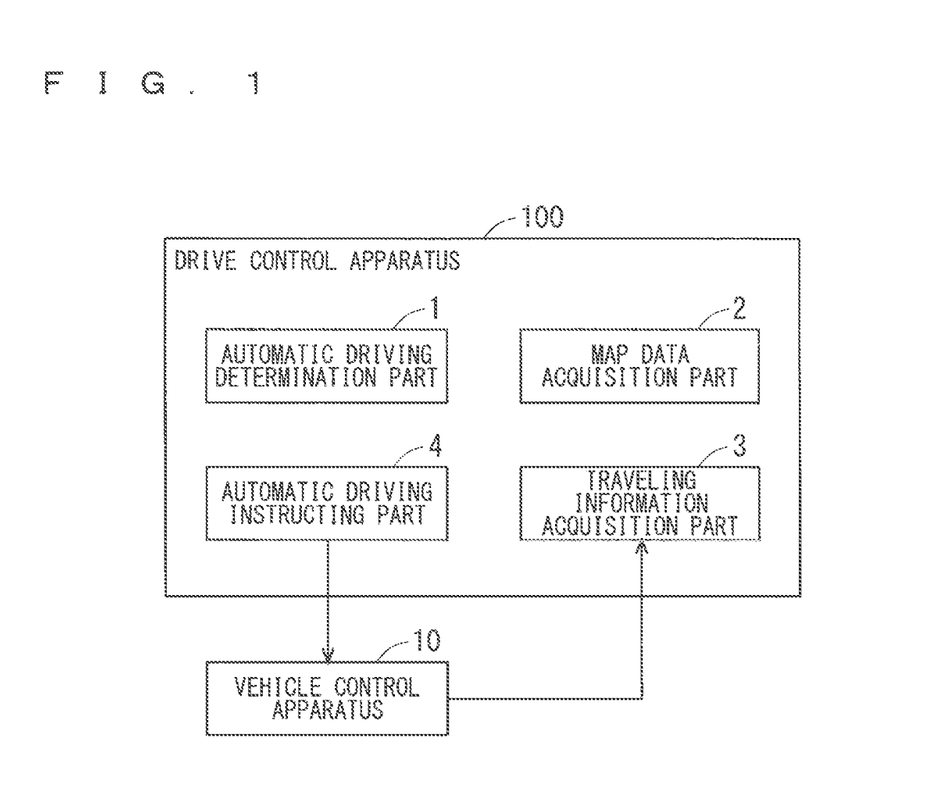
FIG. 1 A block diagram illustrating a configuration of a drive control apparatus according to an embodiment 1.

FIG. 1 is diagram illustrating a basic configuration of a drive control apparatus 100 according to the embodiment 1 of the present invention. The drive control apparatus 100 is an apparatus for controlling a driving of a vehicle having an automatic driving function. The drive control apparatus 100 includes an automatic driving determination part 1, a map data acquisition part 2, a traveling information acquisition part 3, and an automatic driving instructing part 4. "The vehicle" simply described in the present specification hereinafter indicates a vehicle in which the drive control apparatus performs the drive control.

The traveling information acquisition part 3 acquires, from a vehicle control apparatus 10, information indicating which driving state the vehicle is in, a manual driving or an automatic driving, and a speed information of the vehicle. The traveling information acquisition part 3 acquires a position information of the vehicle from a GPS (Global Positioning System) receiver not shown in the drawings. The position information acquired as a GPS signal may be matched to a map data acquired by the map data acquisition part 2 and corrected, or may be matched to a position information acquired from a gyro sensor or a vehicle speed sensor and corrected. These pieces of information acquired by the traveling information acquisition part 3 are collectively referred to as the traveling information.

The map data acquisition part 2 acquires the map data. Information of a parking area and information of a no-parking area are described in the map data. The map data acquisition part 2 may load the map data stored in a storage medium such as a CD, a DVD, or a SD or may communicate with a server to continually acquire the map data.

The automatic driving determination part 1 acquires the traveling information from the traveling information acquisition part 3 and acquires the map data from the map data acquisition part 2. Then, the automatic driving determination part 1 detects a stop position of the vehicle, which is manually driven, from the traveling information. Furthermore, the automatic driving determination part 1 determines whether or not the stop position is included in the no-parking area with reference to the map data. That is to say, the automatic driving determination part 1 has a function as an area determination part for determining whether or not the stop position is included in the no-parking area.

The automatic driving determination part 1 has a function as a parking area searching part which searches for a parking area including an empty space at a time of determining that the stop position is included in the no-parking area.

The automatic driving instructing part 4 instructs the vehicle control apparatus 10 to perform the automatic driving to the parking area including the empty space searched by the automatic driving determination part 1.

<A-2. Effect>

The drive control apparatus 100 includes: the traveling information acquisition part 3 which acquires the traveling information indicating the position, the speed, and the traveling state, that is to say, the automatic driving or the manual driving, of the vehicle having the automatic driving function; an area determination part 23 which detects the stop position of the vehicle, which is manually driven, based on the traveling information and determines whether or not the stop position is included in the no-parking area with reference to the map data in which the information of the parking area and the information of the no-parking area are described; a parking area searching part 24 which searches for the parking area including the empty space when it is determined that the stop position is included in the no-parking area in the area determination part 23; and the automatic driving instructing part 4 which instructs the vehicle to perform the automatic driving from the stop position to the parking area including the empty space. Accordingly, when the user manually drives the vehicle and gets out of the vehicle in a certain point, which is included in the no-parking area, the vehicle performs the automatic driving to the parking area including the empty space around the alighting point. There is therefore no need for the user to search for the parking area after consideration of whether or not the stop position is located in the no-parking area and drive to the parking area.

A drive control method according to the embodiment 1 includes (a) acquiring the traveling information indicating the position, the speed, and the traveling state, that is to say, the automatic driving or the manual driving, of the vehicle having the automatic driving function, (b) detecting the stop position of the vehicle, which is manually driven, based on the traveling information, (c) determining whether or not the stop position is included in the no-parking area with reference to the map data in which the information of the no-parking area is described, (d) searching for the parking area including the empty space when it is determined that the stop position is included in the no-parking area, and (e) instructing the vehicle to perform the automatic driving from the stop position to the parking area including the empty space. Accordingly, when the user manually drives the vehicle and gets out of the vehicle in a certain point, which is included in the no-parking area, the vehicle performs the automatic driving to the parking area including the empty space around the alighting point. There is therefore no need for the user to search for the parking area after consideration of whether or not the stop position is located in the no-parking area and drive to the parking area.

<B. Embodiment 2>
<B-1. Configuration>

Figure 2:
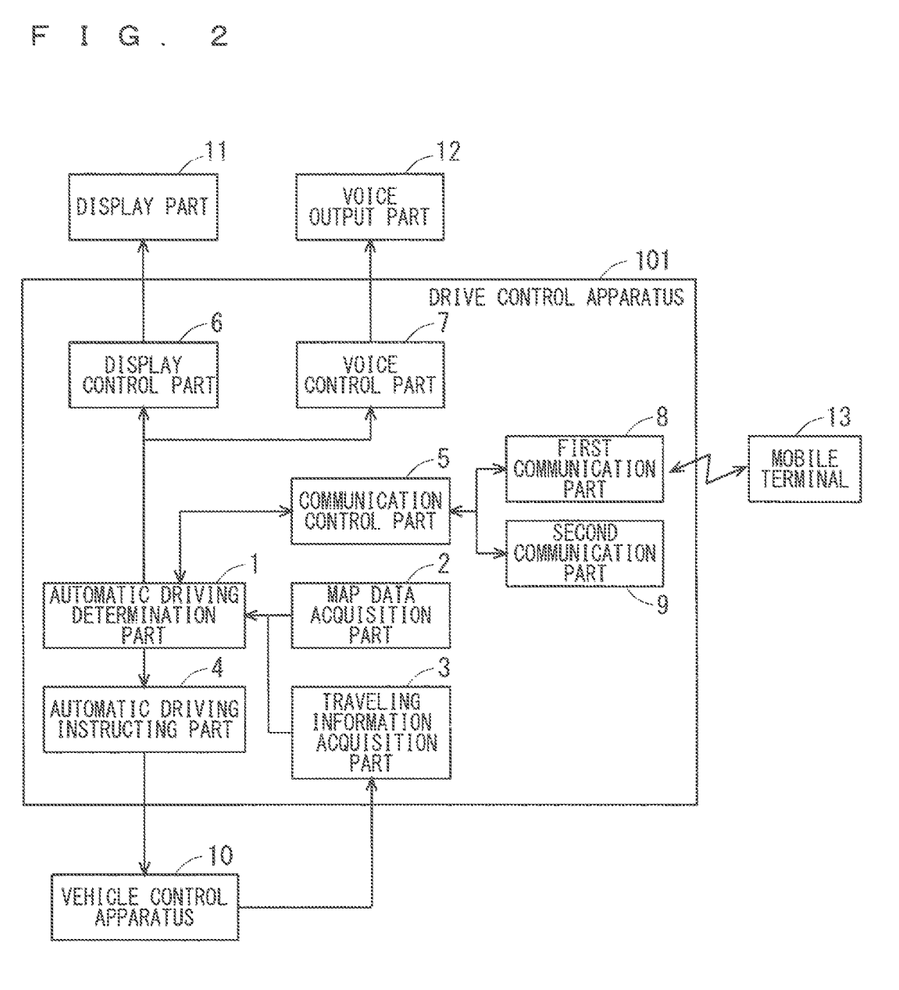
FIG. 2 A block diagram illustrating a configuration of a drive control apparatus according to an embodiment 2.

FIG. 2 is a block diagram illustrating a configuration of a drive control apparatus 101. In the embodiment 2, the drive control apparatus 101 is described as an apparatus mounted on the vehicle. "The apparatus mounted on the vehicle" includes not only an apparatus constantly mounted on the vehicle but also an apparatus brought and used in the vehicle as needed. The drive control apparatus 101 includes, in addition to the configuration of the drive control apparatus 100, a communication control part 5, a first communication part 8, a second communication part 9, a display control part 6, and a voice control part 7.

The communication control part 5 controls a communication between the drive control apparatus 101 and outside, and performs a communication using the first communication part 8 and the second communication part 9. The first communication part 8 communicates with a mobile terminal 13. The mobile terminal 13 is a mobile terminal such as a smartphone or a PDA (Personal Data Assistance) held by a driver of the vehicle whose driving is controlled by the drive control apparatus 101 and is registered in the drive control apparatus 101 in advance. The communication between the first communication part 8 and the mobile terminal 13 is performed via a communication network such as 3G network, for example.

The second communication part 9 communicates with a facility including the parking area described hereinafter via WLAN (Wireless Local Area Network), for example. Alternatively, the communication may be performed via ETC (Electronic Toll Collection System (registered trademark)).

The display control part 6 controls a display part 11 mounted on the vehicle. In FIG. 2, the display part 11 is configured separately from the drive control apparatus 101, however, the display part 11 may constitute the drive control apparatus 101. The display part 11 is a display such as a liquid crystal display (LCD: Liquid Crystal Display).

The voice control part 7 controls a voice output part 12 such as a speaker mounted on the vehicle. In FIG. 2, the voice output part 12 is configured separately from the drive control apparatus 101, however, the voice output part 12 may constitute the drive control apparatus 101.

Figure 3:
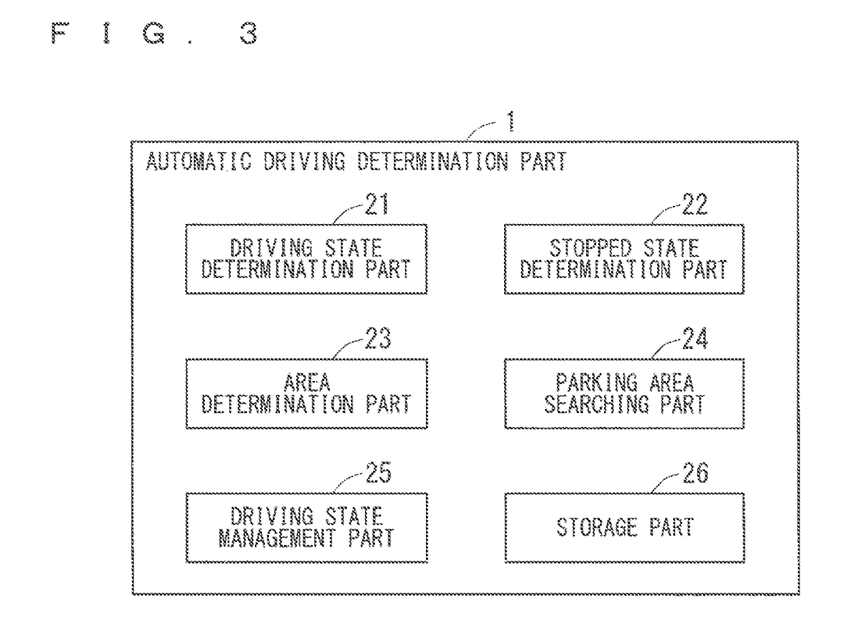
FIG. 3 A block diagram illustrating an inner configuration of an automatic driving determination part according to the embodiment 2.

FIG. 3 is a block diagram illustrating an inner configuration of the automatic driving determination part 1. The automatic driving determination part 1 includes a driving state determination part 21, a stopped state determination part 22, the area determination part 23, the parking area searching part 24, a driving state management part 25, and a storage part 26.

The driving state determination part 21 determines whether the vehicle is automatically driven or manually driven based on the information indicating the driving state acquired from the traveling information acquisition part 3.

The stopped state determination part 22 determines whether or not the vehicle has stopped based on the speed of the vehicle acquired from the traveling information acquisition part 3.

Upon recognition that the vehicle which has been manually driven is stopped in accordance with a determination result of the driving state determination part 21 and the stopped state determination part 22, the area determination part 23 acquires a current position of the vehicle, that is to say, the stop position of the vehicle from the traveling information acquisition part 3. Then, the area determination part 23 determines whether or not the stop position is included in the no-parking area with reference to the map data.

When the area determination part 23 determines that the stop position is included in the no-parking area, the parking area searching part 24 searches for the parking area including the empty space around the stop position with reference to the map data, for example. When an appropriate parking area including the empty space is found, the parking area including the empty space is stored as a destination in the storage part 26.

The driving state management part 25 manages a driving mode (an automatic driving mode or a manual driving mode) of the vehicle and a traveling mode (a moving mode, a going-back mode, or none of them) of the vehicle described hereinafter.

Figure 4:
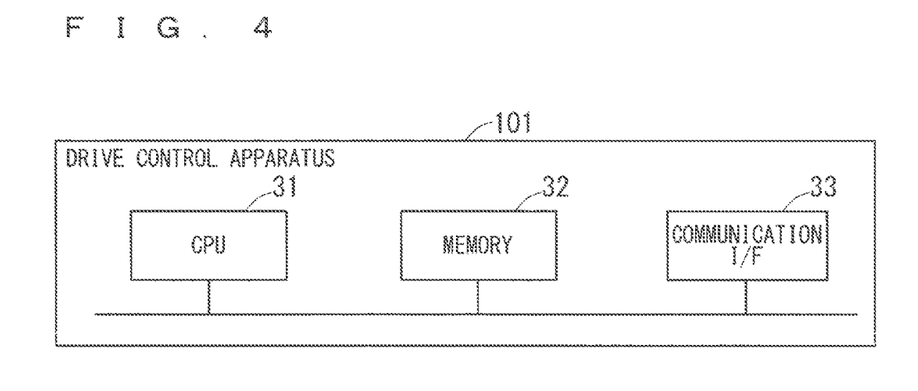
FIG. 4 A diagram illustrating a hardware configuration of the drive control apparatus according to the embodiment 2.

FIG. 4 is a diagram illustrating a hardware configuration of the drive control apparatus 101. The drive control apparatus 101 is achieved by a CPU 31, a memory 32, and a communication interface (I/F) 33. When the CPU 31 executes a program stored in the memory 32 such as a RAM (Random Access Memory), the automatic driving determination part 1, the map data acquisition part 2, the traveling information acquisition part 3, the automatic driving instructing part 4, the display control part 6, the voice control part 7, and the communication control part 5 are achieved as a function of the CPU 31. However, they may also be achieved by a plurality of CPUs 31 collaborating with each other, for example. The first communication part 8 and the second communication part 9 are achieved by the communication I/F 33.

<B-2. Operation>

Figure 5:
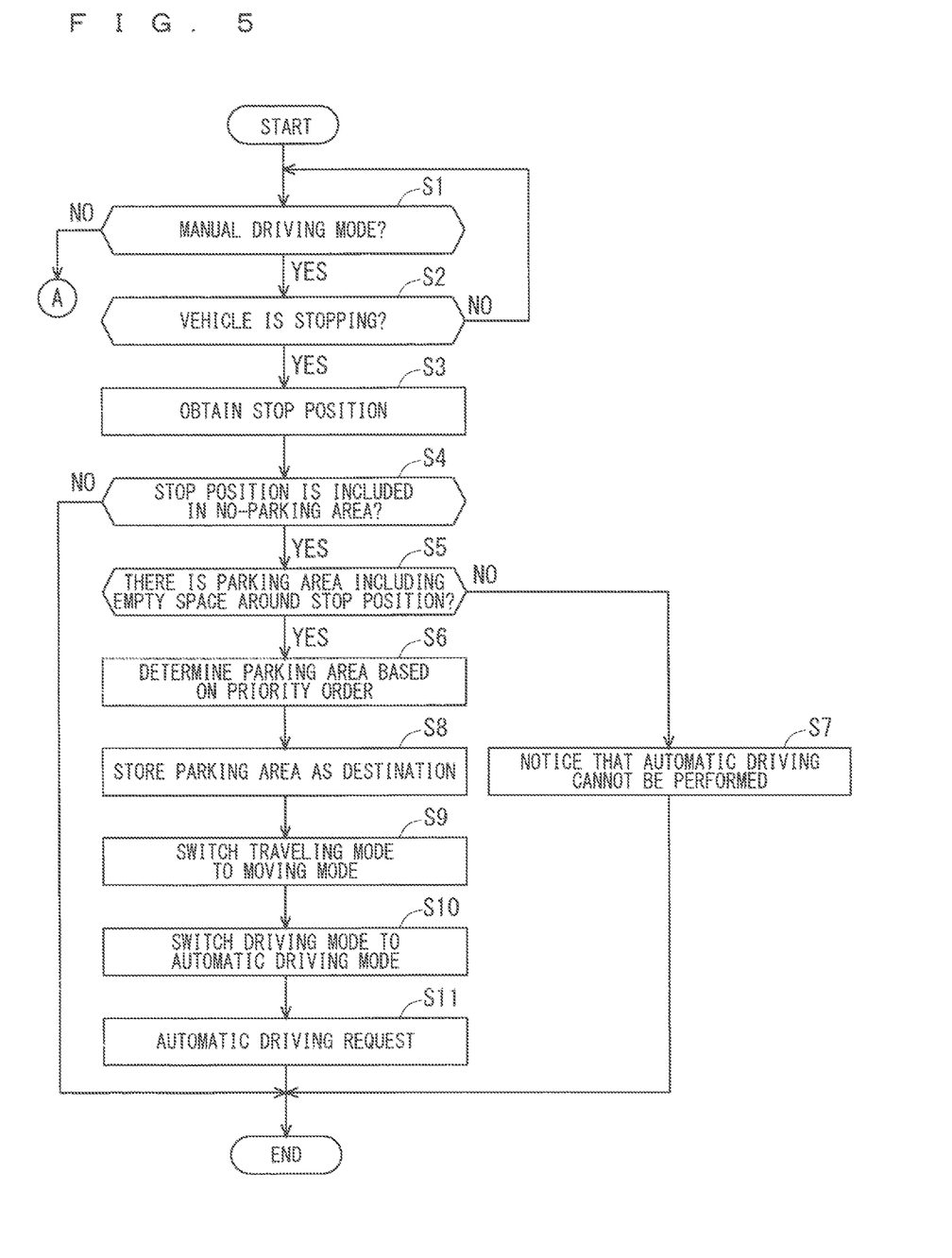
FIG. 5 A flow chart showing an operation of the drive control apparatus according to the embodiment 2.

FIG. 5 is a flow chart showing an operation of the drive control apparatus 101. When an accessory power source of the vehicle is turned on and a power is applied to the drive control apparatus 101, the drive control apparatus 101 starts the operation shown in FIG. 5.

Firstly, the driving state management part 25 determines whether or not the driving mode is in the manual driving mode (Step S1). When the driving state determination part 21 determines that the vehicle is automatically driven, the driving state management part 25 sets the driving mode to the automatic driving mode, and when the driving state determination part 21 determines that the vehicle is manually driven, the driving state management part 25 sets the driving mode to the manual driving mode.

When the driving mode is the manual driving mode, the procedure proceeds to Step S2. An operation in the case where the driving mode is the automatic driving mode is described later in FIG. 6.

In Step S2, the stopped state determination part 22 acquires the speed information of the vehicle from the traveling information acquisition part 3 and determines whether or not the vehicle is currently stopping based on the speed information. Specifically, when the speed of the vehicle remains 0 for a certain period of time, it can be determined that the vehicle is stopping. When the vehicle is not stopping, the procedure returns to Step S1.

When the vehicle is stopping, the area determination part 23 acquires the current position information of the vehicle from the traveling information acquisition part 3 and determines it as the position information of the stop position (Step S3). Then, the area determination part 23 determines whether or not the stop position is included in the no-parking area with reference to the map data (Step S4). In the map data, a specific area in the map is defined as the no-parking area. The no-parking area may be an area where the parking is legally prohibited or an area where a crackdown on the illegal parking is intensively performed.

When the stop position is located outside the no-parking area, the processing is finished. In the above case, the vehicle does not perform the automatic driving even when the user gets out of the vehicle therein.

When the stop position is included in the no-parking area, the parking area searching part 24 searches for the parking area including the empty space around the stop position with reference to the map data (Step S5). Herein, the area "around the stop position" to be searched indicates a region within a radius of 300 m from the stop position, for example. Alternatively, when the display part 11 displays a map of the area around the vehicle, the area displayed in the screen may be the area to be searched. The parking area searching part 24 refers to a vacancy information of the parking area to confirm whether the parking area includes the empty space. The vacancy information of the parking area is acquired by the communication control part 5 from a communication network via the first communication part 8, for example. For example, the vacancy information can be acquired from VICS (Vehicle Information and Communication System (registered trademark)) information. A search result of the parking area may be acquired from an external server or the like instead of searching the parking area with reference to the map data.

When a plurality of parking areas including the empty space are found around the stop position (Step S5: Yes), one parking area is determined from among them based on a priority order (Step S6). The priority order, which is preset, is an ascending order according to price, in order of increasing distance from the stop position, for example. The user may set the priority order from an input part not shown in the drawings.

In contrast, when no parking area including the empty space is found in the searched area (Step S5: No), a notice that the automatic driving cannot be performed is provided (Step S7). At this time, the display control part 6 display a screen of providing a notice of "No parking area including the empty space is found. The automatic driving to the parking area cannot be performed." on the display part 11, for example. Alternatively, the voice control part 7 may cause the voice output part 12 to output voice to provide the similar notice.

When the parking area is determined in Step S6, the storage part 26 stores the position information of the parking area as the destination (Step S8). The driving state management part 25 sets the traveling mode to the moving mode (Step S9) and sets the driving mode to the automatic driving mode (Step S10). Then, the automatic driving instructing part 4 requires the automatic driving from the current position to the parking area of the vehicle control apparatus 10 (Step S11). In the above described manner, the vehicle performs the automatic driving to the parking area around the stop position after the user gets out of the vehicle.

Figure 6:
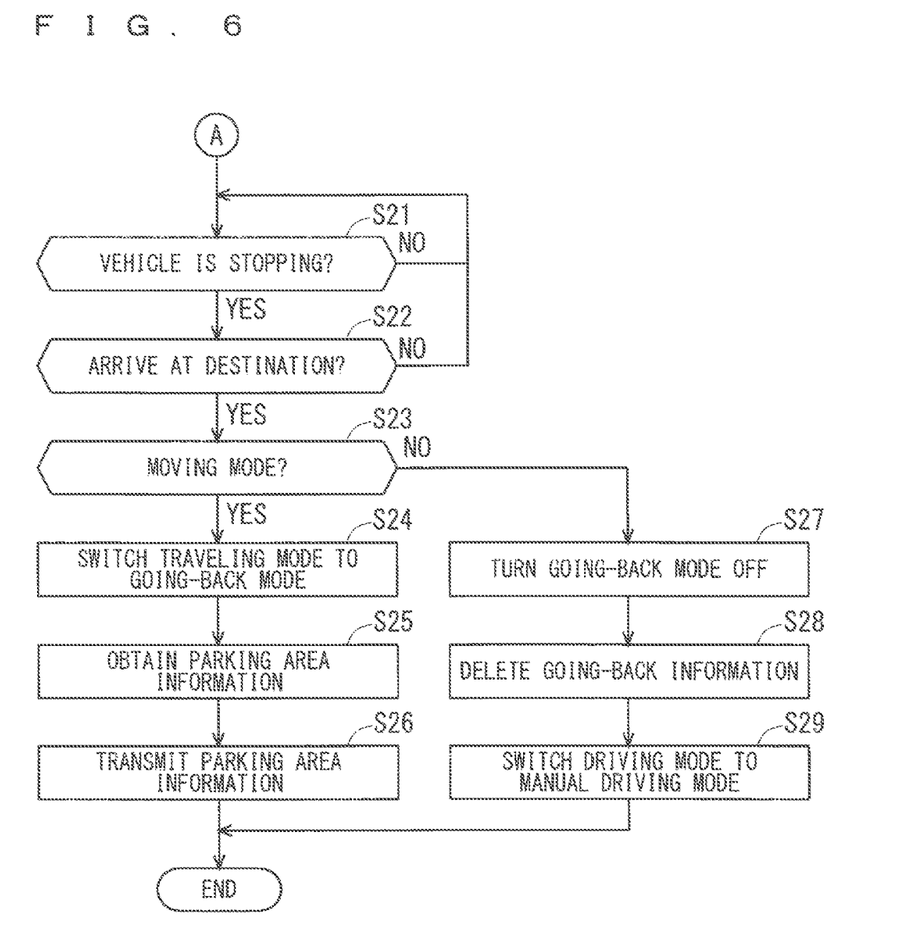
FIG. 6 A flow chart showing the operation of the drive control apparatus according to the embodiment 2.

FIG. 6 is a flow chart showing an operation of the drive control apparatus 101 at the time of automatic driving. When the driving mode is the automatic driving mode, the stopped state determination part 22 determines whether or not the vehicle is currently stopping in a manner similar to Step S2 (Step S21). When the vehicle is not stopping, Step S21 is repeated until the vehicle stops.

When the vehicle stops, the stopped state determination part 22 acquires the current position information of the vehicle from the traveling information acquisition part 3, refers to the position information of the destination (the parking area) stored in the storage part 26, thereby determining whether or not the vehicle has arrived at the destination (Step S22). When the vehicle has not arrived at the destination, Step S21 and Step S22 are repeated until the vehicle arrives.

When the vehicle arrives at the destination, the driving state management part 25 determines whether or not the current traveling mode is the moving mode (Step S23). When the traveling mode is the moving mode, the driving state management part 25 switches the traveling mode to the going-back mode (Step S24).

Then, the automatic driving determination part 1 acquires a parking area information from a facility including the parking area in the destination via the communication control part 5 and the second communication part 9 (Step S25). The parking area information may include a payment information such as a method of payment and a fee in addition to the position information of the parking area. The parking area information may also include information which parking space the vehicles has parked in.

The automatic driving determination part 1 transmits the acquired parking area information described above to the mobile terminal 13 of the user via the communication control part 5 and the first communication part 8 (Step S26). Accordingly, the user can grasp a fact that the vehicle has been parked, a parking area where the vehicle has been parked, and a fee for parking. Specifically, since the user is notified of the position information of the parking area, when the parking area is located near the current location of the user, the user can walk to the parking area by himself/herself in accordance with circumstances so as to get in the vehicle next time.

An operation in the case where the traveling mode is not the moving mode, that is to say, the case where the traveling mode is the going-back mode in Step S23 is described hereinafter.

Described above is that in Steps S25 and S26 in FIG. 6, the parking area information is acquired from the facility including the parking area and the parking area information is transmitted to the mobile terminal 13 of the user. These operations are described in more detail using a time chart shown in FIG. 7.

Figure 7:
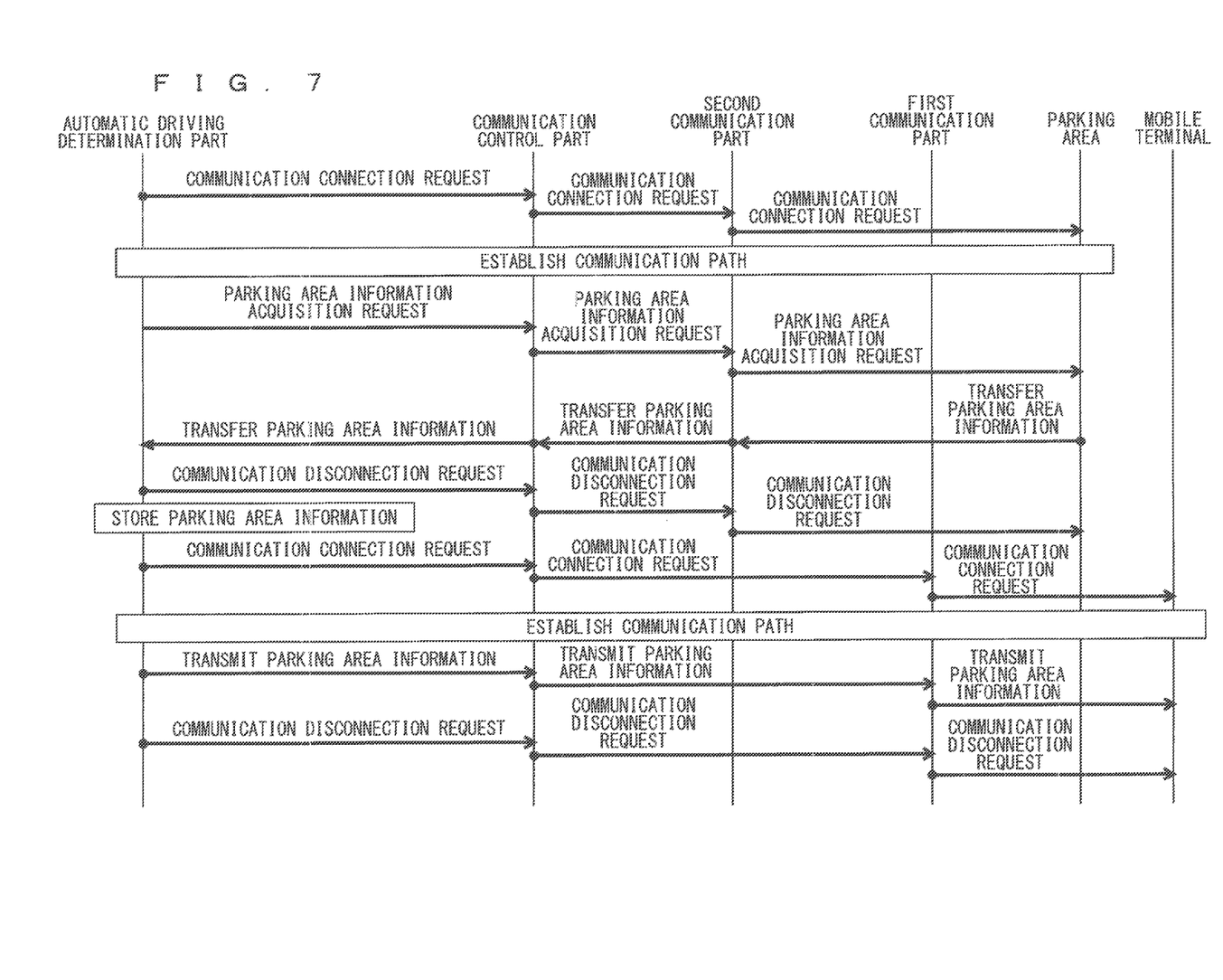
FIG. 7 A diagram illustrating an acquisition operation and a transmission operation of a parking area information.

Firstly, the automatic driving determination part 1 performs a communication connection request on the communication control part 5. Upon receipt of the request, the communication connection part 5 performs a communication connection request on the second communication part 9, and the second communication part 9 performs a communication connection request on a facility including the parking area in the destination. A communication path is thereby established among the automatic driving determination part 1, the communication control part 5, the second communication part 9, and the facility including the parking area.

Subsequently, the automatic driving determination part 1 performs a parking area information acquisition request on the communication control part 5. Upon receipt of the request, the communication control part 5 performs a parking area information acquisition request on the second communication part 9, and the second communication part 9 performs a parking area information acquisition request on the facility including the parking area.

Then, the parking area information is transmitted from the facility including the parking area to the second communication part 9, from the second communication part 9 to the communication control part 5, from the communication control part 5 to the automatic driving determination part 1 (Step S25 in FIG. 6).

Upon acquisition of the parking area information, the automatic driving determination part 1 performs a communication disconnection request on the communication control part 5. The communication disconnection request is sequentially transmitted from the communication control part 5 to the second communication part 9 and from the second communication part 9 to the facility including the parking area, and the communication path is thereby blocked. The automatic driving determination part 1 stores the parking area information in the storage part 26.

Next, the automatic driving determination part 1 performs a communication connection request on the communication control part 5. Upon receipt of the request, the communication connection part 5 performs a communication connection request on the first communication part 8, and the first communication part 8 performs a communication connection request on the mobile terminal 13. A communication path is thereby established among the automatic driving determination part 1, the communication control part 5, the first communication part 8, and the mobile terminal 13.

Subsequently, the parking area information is transmitted from the automatic driving determination part 1 to the communication control part 5, from the communication control part 5 to the first communication part 8, from the first communication part 8 to the mobile terminal 13 in this order (Step S26 in FIG. 6).

Then, the automatic driving determination part 1 performs a communication disconnection request on the communication control part 5. The communication disconnection request is sequentially transmitted from the communication control part 5 to the first communication part 8 and from the first communication part 8 to the mobile terminal 13, and the communication path is thereby blocked.

Described so far is that when the user gets out of the vehicle, the vehicle performs the automatic driving to the parking area around the alighting point and is parked there, and the parking area information is transmitted to the mobile terminal 13. When the user performs a going-back request on the drive control apparatus 101 using the mobile terminal 13 in the above state, the user can cause the vehicle to leave the parking area with automatic driving to go back to a place specified by the user. An operation of the drive control apparatus 101 for achieving the going-back operation of the vehicle is described hereinafter along FIGS. 8 and 9.

Figure 8:
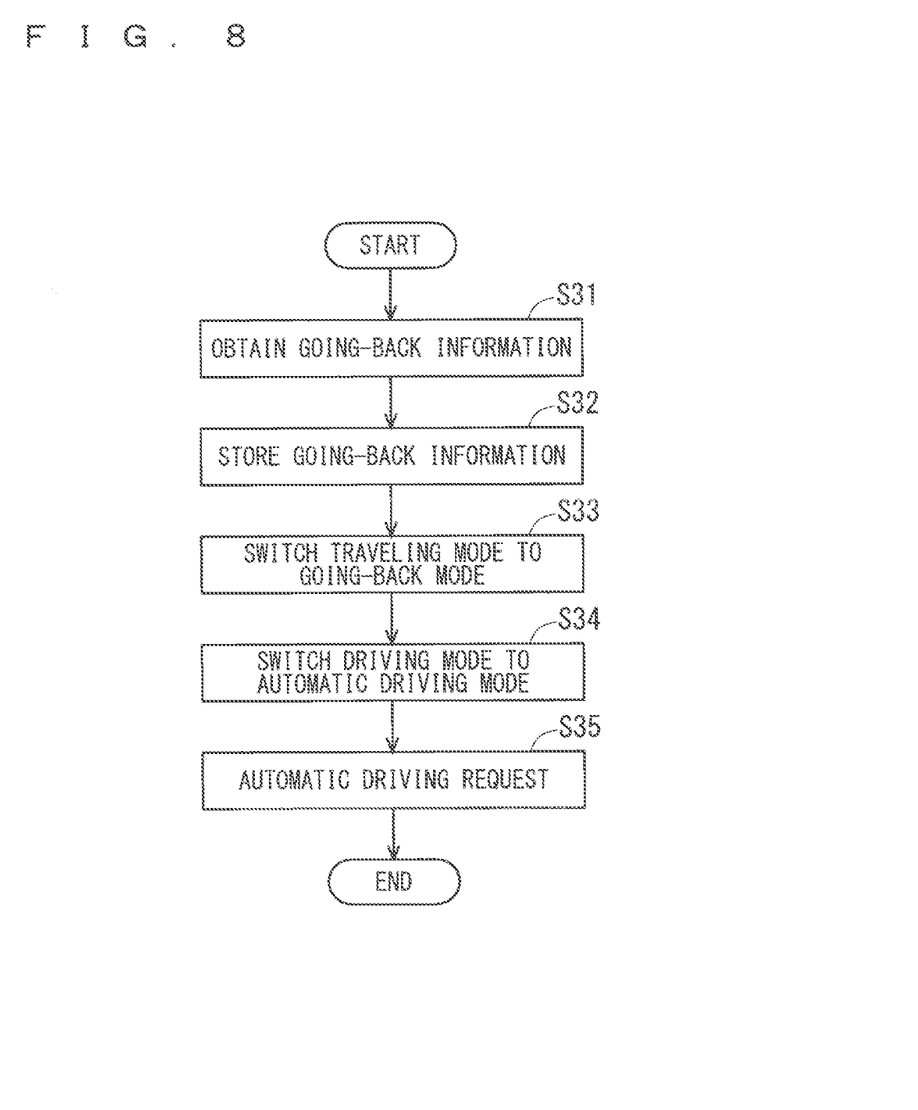
FIG. 8 A flow chart showing the operation of the drive control apparatus according to the embodiment 2.

FIG. 8 is a flow chart showing an operation of the drive control apparatus 101 receiving the going-back request from the mobile terminal 13. Firstly, the automatic driving determination part 1 acquires the going-back information from the mobile terminal 13 via the communication control part 5 and the first communication part 8 (Step S31). The going-back information may include the position information of a next getting-in point and may also include information of a getting-in time at the next getting-in point. Alternatively, the going-back information may include information of time when the vehicle leaves the parking area. That is to say, the user specifies these information and performs the going-back request. When the user performs the going-back request without specifying the next getting-in point, the point where the user gets out of the vehicle, that is to say, the point where the vehicle start the automatic driving may be set to the next getting-in point.

Next, the automatic driving determination part 1 stores the going-back information in the storage part 26 (Step S32).

Then, the driving state management part 25 sets the traveling mode to the going-back mode (Step S33) and sets the driving mode to the automatic driving mode (Step S34).

Then, the automatic driving instructing part 4 instructs the vehicle control apparatus 10 to perform the automatic driving in accordance with the contents of the going-back information (Step S35). The vehicle thereby starts the automatic driving in accordance with the going-back information. When the user specifies the next getting-in point in the going-back request, the vehicle starts the automatic driving toward the next getting-in point.

Described in Steps S31 and 32 in FIG. 8 is that the going-back information is acquired from the mobile terminal 13 and stored. These operations are described in more detail using a time chart shown in FIG. 9.

Figure 9:
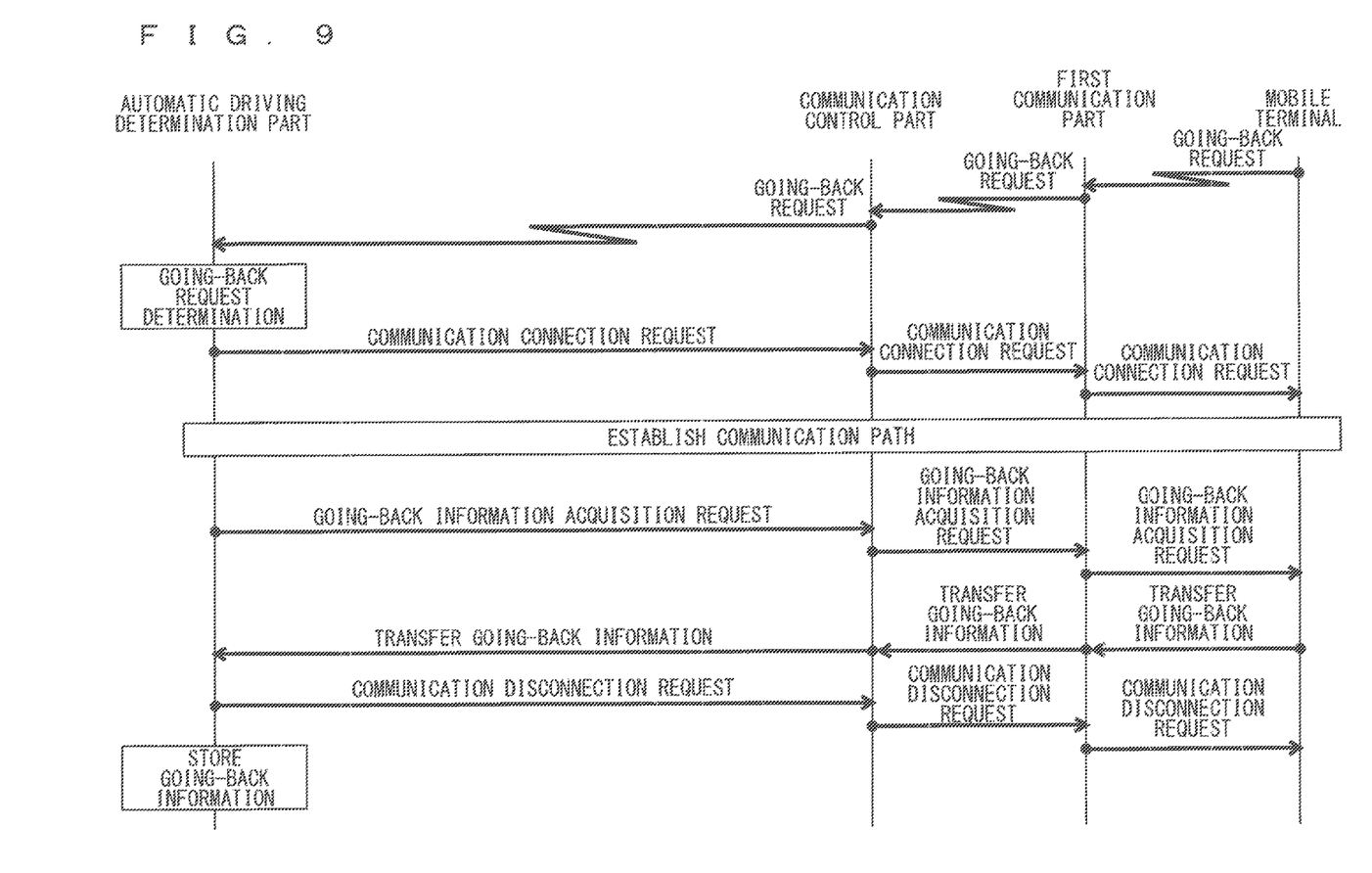
FIG. 9 A diagram illustrating an acquisition operation of a going-back information.

When the first communication part 8 acquires the going-back request from the mobile terminal 13, the going-back request is transmitted from the first communication part 8 to the communication control part 5 and from the communication control part 5 to the automatic driving determination part 1. Upon determination that the going-back request is received, the automatic driving determination part 1 performs a communication connection request on the communication control part 5. Upon receipt of the request, the communication connection part 5 performs a communication connection request on the first communication part 8, and the first communication part 8 performs a communication connection request on the mobile terminal 13. A communication path is thereby established among the automatic driving determination part 1, the communication control part 5, the first communication part 8, and the mobile terminal 13.

Subsequently, the automatic driving determination part 1 performs a going-back information acquisition request on the communication control part 5. Upon receipt of the request, the communication control part 5 performs a going-back information acquisition request on the first communication part 8, and the first communication part 8 performs a going-back information acquisition request on the mobile terminal 13. Then, the going-back information is sequentially transferred from the mobile terminal 13 to the first communication part 8, from the first communication part 8 to the communication control part 5, and from the communication control part 5 to the automatic driving determination part 1.

Upon acquisition of the going-back information, the automatic driving determination part 1 performs a communication disconnection request on the communication control part 5. The communication disconnection request is sequentially transmitted from the communication control part 5 to the first communication part 8 and from the first communication part 8 to the mobile terminal 13, and the communication path is thereby blocked. The automatic driving determination part 1 stores the going-back information in the storage part 26.

Next, an operation of the drive control apparatus 101 in the case where the vehicle performs the automatic driving in the going-back mode is described along FIG. 6. When the driving mode is the automatic driving mode, the stopped state determination part 22 determines whether or not the vehicle is currently stopping in a manner similar to Step S2 (Step S21). When the vehicle is not stopping, Step S21 is repeated until the vehicle stops.

When the vehicle stops, the stopped state determination part 22 acquires the current position information of the vehicle from the traveling information acquisition part 3, refers to the position information of the destination (the next getting-in point) stored in the storage part 26, thereby determining whether or not the vehicle has arrived at the destination (Step S22). When the vehicle has not arrived at the next getting-in point, Step S21 and Step S22 are repeated until the vehicle arrives.

When the vehicle arrives at the next getting-in point, the driving state management part 25 determines whether or not the current traveling mode is the moving mode (Step S23). Herein, the traveling mode is the going-back mode, so that the procedure proceeds to Step S27. In Step S27, the driving state management part 25 turns off the going-back mode in the traveling mode. That is to say, the traveling mode at this time is not any of the moving mode and the traveling mode.

Next, the going-back information stored in the storage part 26 is deleted (Step S28). Then, the driving state management part 25 switches the driving mode from the automatic driving mode to the manual driving mode (Step S29).

As described above, since the drive control apparatus 101 switches the driving mode to the manual driving mode after causing the vehicle to perform the automatic driving to the next getting-in point, the user who gets in the vehicle at the next getting-in point can manually drive the vehicle.

<B-3. Modification Example>

The drive control apparatus 101 is described above as an in-vehicle apparatus. However, the drive control apparatus according to the present invention may be configured by appropriately combining a mobile terminal such as a mobile phone, a smartphone, or a tablet and a server other than the in-vehicle apparatus. In the above case, each configuration of the drive control apparatus is separately disposed in the in-vehicle apparatus, the mobile terminal, and the server.

Figure 10:
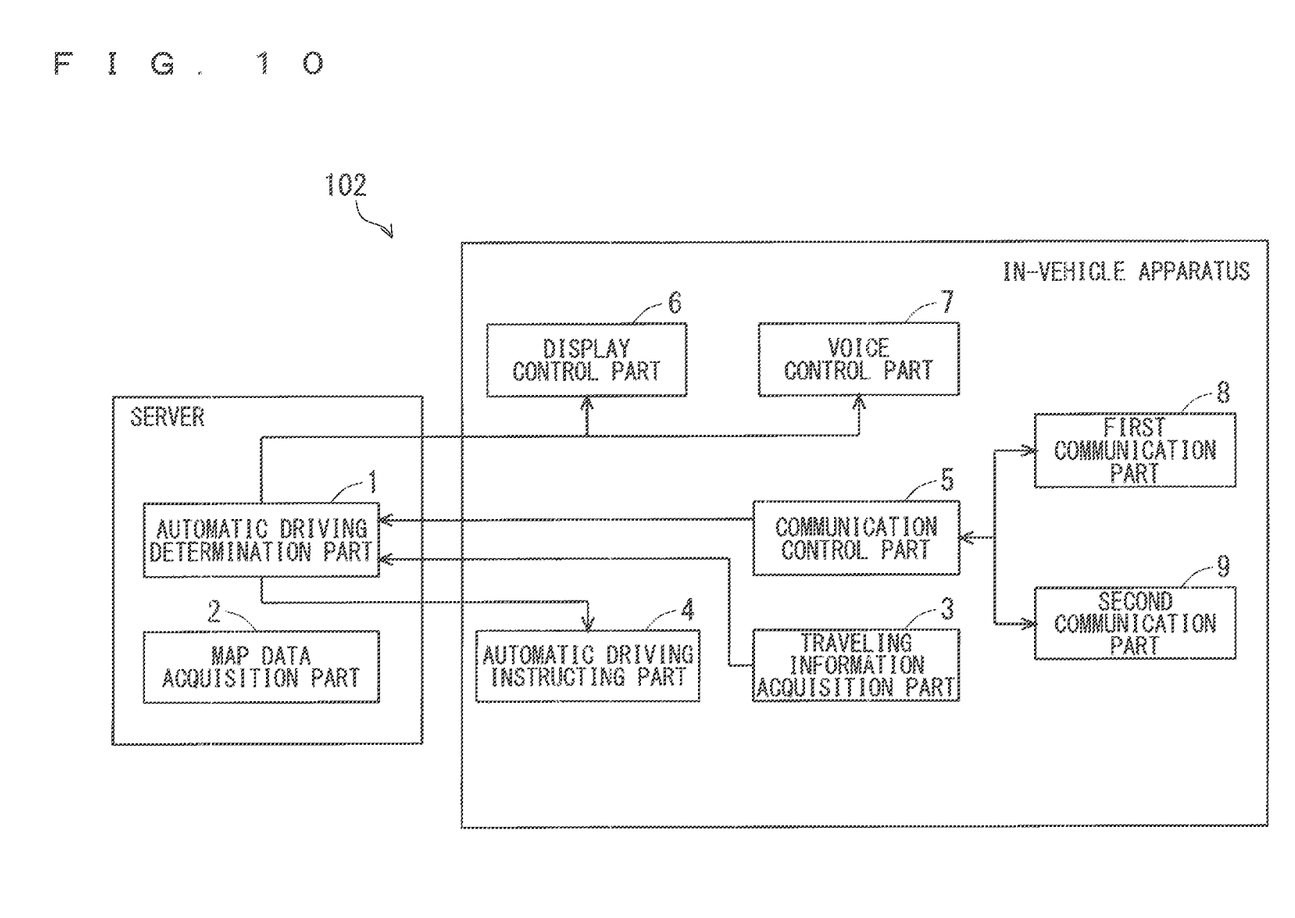
FIG. 10 A block diagram illustrating a configuration of a drive control apparatus according to a modification example.

FIG. 10 is a block diagram illustrating a configuration of a drive control apparatus 102 made up of the in-vehicle apparatus and the server as one example of the above separated configuration. Although each configuration of the drive control apparatus 102 is similar to that of the drive control apparatus 101, the automatic driving determination part 1 and the map data acquisition part 2 are disposed in the server, and the other configuration is disposed in the in-vehicle apparatus.

In the above description, when the CPU 31 executes a program stored in the memory 32 such as a RAM (Random Access Memory), the automatic driving determination part 1, the map data acquisition part 2, the traveling information acquisition part 3, the automatic driving instructing part 4, the display control part 6, the voice control part 7, and the communication control part 5 are achieved as the function of the CPU 31. However, instead of the above configuration, the automatic driving determination part 1, the map data acquisition part 2, the traveling information acquisition part 3, the automatic driving instructing part 4, the display control part 6, the voice control part 7, and the communication control part 5 may be achieved by a signal processing circuit which achieves the operation with an electrical circuit of the hardware. A term of "processing circuit" may be used instead of the term of "part" as a concept of combining the automatic driving determination part 1, the map data acquisition part 2, the traveling information acquisition part 3, the automatic driving instructing part 4, the display control part 6, the voice control part 7, the communication control part 5 of the software, and the automatic driving determination part 1, the map data acquisition part 2, the traveling information acquisition part 3, the automatic driving instructing part 4, the display control part 6, the voice control part 7, the communication control part 5 of the hardware.

<B-4. Effect>

The drive control apparatus 102 according to the embodiment 2 includes a notification part to provide a notice, when no parking area including the empty space is found around the stop position by the search performed by the parking area searching part 24, of its search result to the user. Accordingly, the user can recognize that he/she should not get out of the vehicle in that stop position.

Moreover, the drive control apparatus 102 includes the communication control part 5 (the communication part) communicating with the mobile terminal of the user, and the communication control part 5 transmits a notice information (the parking area information) regarding the parking to the mobile terminal 13 after the vehicle completes the automatic driving to the parking area including the empty space. Accordingly, the user can recognize that the vehicle has been parked in the parking area.

The parking area information described above includes at least one of the position information and the payment information of the parking area including the empty space. In the case where the parking area information includes the position information, when the parking area is located near the current location of the user, for example, the user can walk to the parking area by himself/herself in accordance with circumstances to get in the vehicle next time. In the case where the parking area information includes the payment information, the user can be notified of the fee for parking. Therefore, when the parking area has a charge system that the charge is added every hour, for example, the user can cause the vehicle to leave the parking area at an appropriate timing before the charge is added in accordance with circumstances.

The communication control part 5 (the communication part) receives the going-back information (the getting-in information) including the position information of the next getting-in point from the mobile terminal 13. When the communication control part 5 receives the going-back information (the getting-in information), the automatic driving instructing part 4 instructs the vehicle to perform the automatic driving from the parking area including the empty space to the next getting-in point. Accordingly, the user can call the vehicle to a location convenient to the user when the user intends to drive the vehicle again after getting out of the vehicle, so that the user does not need to move to the parking area.

When the next getting-in point whose position information is included in the going-back information is the position of the mobile terminal 13, the vehicle can be called to the current location of the user holding the mobile terminal 13.

The going-back information (getting-in information) includes the information of the getting-in time, and the automatic driving instructing part 4 instructs the vehicle to perform the automatic driving from the parking area including the empty space to the next getting-in point in accordance with the getting-in time. Accordingly, it is possible to call the vehicle to the location convenient to the user at a time specified by the user.

According to the present invention, the above embodiments can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

REFERENCE SIGNS LIST

1 Automatic driving determination part, 2 Map data acquisition part, 3 Traveling information acquisition part, 4 Automatic driving instructing part, 5 Communication control part, 6 Display control part, 7 Voice control part, 8 First communication part, 9 Second communication part, 10 Vehicle control apparatus, 11 Display part, 12 Voice output part, 13 Mobile terminal, 31 CPU, 32 Memory, 33 Communication interface, 100 to 102 Drive control apparatus.

The invention claimed is:

1. A drive control apparatus, comprising:
a processor to execute a program; and
a memory to store the program which, when executed by the processor, performs processes of,
  acquiring a traveling information indicating a position, a speed, and a traveling state, corresponding to an automatic driving or a manual driving, of a vehicle having an automatic driving function;
  detecting a stop position of said vehicle, which is manually driven, based on said traveling information and determining whether or not said stop position is included in a no-parking area with reference to a map data in which information of said no-parking area is described;
  searching for a parking area including an empty space when it is determined that said stop position is included in said no-parking area;
  instructing said vehicle to perform an automatic driving from said stop position to said parking area including said empty space;
  receiving a getting-in information including a position information of a next getting-in point from a mobile terminal of a user; and
  instructing said vehicle to perform said automatic driving from said parking area including said empty space to said next getting-in point, when receiving said getting-in information.

2. The drive control apparatus according to claim 1, wherein said program which, when executed by said processor, further performs the process of providing a notice, when no parking area including said empty space is found around said stop position by searching for said parking area, of a search result thereof to a user.

3. The drive control apparatus according to claim 1, wherein said program which, when executed by said processor, further performs the process of transmitting a notice information regarding a parking to said mobile terminal after said vehicle completes said automatic driving to said parking area including said empty space.

4. The drive control apparatus according to claim 3, wherein said notice information includes at least one of a position information and a payment information of said parking area including said empty space.

5. The drive control apparatus according to claim 1, wherein said next getting-in point is a position of said mobile terminal.

6. The drive control apparatus according to claim 1, wherein
said getting-in information includes information of a getting-in time, and
instructing said vehicle to perform said automatic driving from said parking area including said empty space to said next getting-in point is performed in accordance with said getting-in time.

7. A drive control method comprising:
(a) acquiring a traveling information indicating a position, a speed, and a traveling state, corresponding to an automatic driving or a manual driving, of a vehicle having an automatic driving function;
(b) detecting a stop position of said vehicle, which is manually driven, based on said traveling information;
(c) determining whether or not said stop position is included in a no-parking area with reference to a map data in which information of said no-parking area is described;
(d) searching for a parking area including an empty space when it is determined that said stop position is included in said no-parking area;
(e) instructing said vehicle to perform an automatic driving from said stop position to said parking area including said empty space; and
(f) when receiving a getting-in information including a position information of a next getting-in point from a mobile terminal of a user, instructing said vehicle to perform said automatic driving from said parking area including said empty space to said next getting-in point.

* * * * *